United States Patent [19]

Yamaga

[11] Patent Number: 5,362,229
[45] Date of Patent: Nov. 8, 1994

[54] PIPING CONNECTION DEVICE

[75] Inventor: Kenichi Yamaga, Sagamihara, Japan

[73] Assignees: Tokyo Electron Kabushiki Kaisha; Tokyo Electron Tohoku Kabushiki Kaisha, Japan

[21] Appl. No.: 79,386

[22] Filed: Jun. 21, 1993

[30] Foreign Application Priority Data

Jun. 22, 1992 [JP] Japan .................. 4-187566

[51] Int. Cl.$^5$ .......................... F27B 9/04; F16L 27/04
[52] U.S. Cl. ................... 432/152; 285/261; 285/264; 285/268; 432/241; 432/72
[58] Field of Search .................. 285/261, 264, 268; 432/5, 6, 152, 241, 99

[56] References Cited

U.S. PATENT DOCUMENTS

| | | | |
|---|---|---|---|
| 4,530,526 | 7/1985 | Dopyera et al. | 285/261 |
| 4,618,173 | 10/1986 | Dopyera e tal. | 285/261 |
| 4,840,409 | 6/1989 | Welkey | 285/261 |
| 4,840,410 | 6/1989 | Welkey | 285/261 |
| 4,987,838 | 1/1991 | Mailliet et al. | 432/99 |
| 5,048,873 | 9/1991 | Allread | 285/261 |
| 5,088,922 | 2/1992 | Kakizaki et al. | 432/152 |

Primary Examiner—Henry C. Yuen
Attorney, Agent, or Firm—Beveridge, DeGrandi, Weilacher & Young

[57] ABSTRACT

In a semiconductor wafer heat-treating apparatus, there is provided a piping connection device on a gas inlet pipe leading to the heat-treating apparatus and a gas outlet pipe derived from the heat-treating apparatus. The piping connection device has a spherical convex connecting element, and a concave connecting element having a concave spherical surface into which the spherical element is snugly fitted. A pair of presser plates are placed on the outer surfaces of the two connecting elements and clamped by bolts so as to press confronting sealing surfaces of the convex and concave connecting elements against each other. Because the outer surfaces of the two connecting elements to be engaged with the pair of presser plates are spherically fashioned, the connection surfaces can present a satisfactory sealing condition without subjecting the pair of the pipes connected by the piping connection device to excessive biasing forces even though the two pipes are angled to each other.

13 Claims, 3 Drawing Sheets

PIPING CONNECTION DEVICE

BACKGROUND OF THE INVENTION

The present invention relates to a piping coupling or connection device, and more particularly, to a piping connection device suitable for use in a semiconductor heat-treating apparatus, a CVD (Chemical Vapor Deposition) apparatus or the like.

A semiconductor wafer heat-treating apparatus is known for carrying out a uniform heat-treatment onto objects, for example, semiconductor wafers to form a thin film on the surfaces thereof or to perform a thermal diffusion. In an oxidation heat-treating apparatus, for example, of this type, water vapor and HCl gas produced by the combustion of hydrogen and oxygen within an external combustion apparatus is supplied into a reaction tube accommodating the objects by way of a gas supply piping made of, for example, quartz glass, and the gas which has completed the treatment on the objects is discharged from a gas exhaust piping connected to the reaction tube.

As a piping coupling or connection device for gastightly connecting the gas supply piping and gas exhaust piping to the heat-treating apparatus, there has been hitherto used a device of a type establishing a gas-tight connection by pressing confronting surfaces of a convex connecting element and a concave connecting element against each other using a pressing connection device.

In such type of piping connection device, however, a presser member may be unevenly abutted against the rear surface of the convex connecting element, for example, of the piping connection device if angularly set pipings are fastened together with the set angle therebetween left as it stands. Accordingly, the clamping of the pressing connection device may subject the pipings to a force which acts to eliminate the angle produced between the pipings and possibly damages the pipings. This imposes a restriction to the freedom of the piping connecting angle in the pipings and necessitates a highly accurate positioning technique upon the disposition of the piping connection device.

SUMMARY OF THE INVENTION

It is therefore the object of the present invention to provide a piping connection device in which the pressure on connection surfaces can be uniformly maintained without applying to pipings such a force that may damage the pipings, irrespective of the variation in the attachment angle of the pipings being connected by the piping connection device, and a secure gas-tightness can be established to prevent a leakage of the fluid passing through the piping connection device.

According to the present invention, there is provided a piping connection device for connecting first and second pipes to be coupled together, comprising a convex connecting element. integrally coupled to the first pipe and defining a sealing surface; a concave connecting element integrally coupled to the second pipe and defining a sealing surface; presser means in engagement with engaging surfaces opposite to said sealing surfaces of the convex and concave connecting elements so as to press together in confrontation the sealing surfaces of the convex and concave connecting elements to thereby establish a sealing condition; the convex connecting element being fashioned to form a generally spherical part extending from the sealing surface to the engaging surface opposite to the sealing surface, the sealing surface on the inside of the concave connecting element being fashioned into a concave spherical surface corresponding to the spherical part.

Since the pressing means are abutted against the spherical part in the present invention even though the first and second pipes are fastened together with an angle between the axes thereof by the presser means, an uneven abutment will not be caused due to the presence of the angle, and hence pipes are not subjected to such force that may damage the pipes, thus ensuring a uniform engagement between the sealing surfaces of the convex and concave connection elements and therefore a satisfactory sealing condition therebetween.

DETAILED DESCRIPTION OF THE PREFERRED EMBODIMENTS

An oxidation-treatment device of a vertical heat-treating apparatus incorporating the present invention will now be specifically described with reference to the accompanying drawings.

Figure 1:
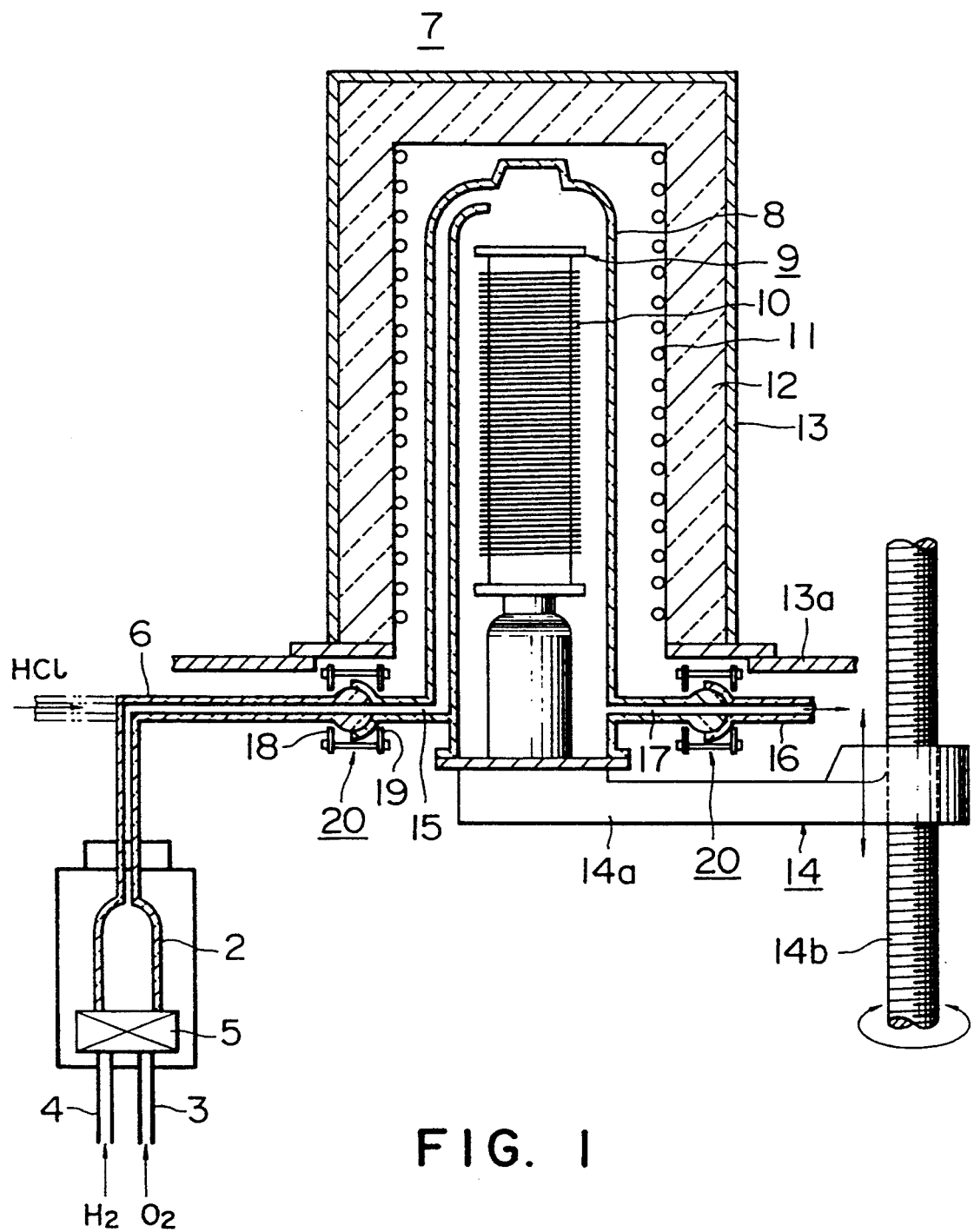
FIG. 1 is a vertical sectional view of a vertical heat-treating apparatus incorporating the present invention.

Referring first to FIG. 1, there is depicted an external combustion device generally designated at 1 and including a combustion container 2 cylindrically shaped from a heat-resistant material such as, for example, a quartz glass. An oxygen supply pipe 3 and a hydrogen supply pipe 4 for the introduction of oxygen and hydrogen, respectively, are connected to the combustion container 2 at its bottom center. An electrical resistance heater 5 which is capable of heating the oxygen gas and the hydrogen gas to a temperature higher than an ignition temperature is provided so as to cover the bottom of the combustion container 2.

A gas supply pipe 6 intended to supply a production gas and made of a heat-resistant and corrosion-resistant material such as, for example, the quartz glass, has one end connected to the combustion container 2 at its top center and the other end connected to a vertical heat-treating apparatus 7 for thermally processing objects.

The vertical heat-treating apparatus 7 includes therein a vertical, cylindrical fixed reaction tube 8 made of a heat-resistant material such as, for example, a quartz glass. The reaction tube 8 has a closed upper end and an open lower end. A known wafer boat 9 made of a heat-resistant material such as, for example, a quartz glass is inserted into the interior of the reaction tube 8 through the open lower end. A multiplicity of objects, for example, semiconductor wafers 10 are removably accommodated within the wafer boat 9 at predetermined vertical pitches. The wafer boat 9 being supported on a base 14a of an elevator 14 is fed into the reaction tube 8 from below by the rotation of a feed screw 14b, and downwardly delivered after the completion of treatment.

A heating means such as, for example, an electrical resistance heater 11 is coaxially provided around the outer periphery of the reaction tube 8. The electrical resistance heater 11 is supported on the inside of a stainless steel tubular outer shell 13 through a heat insulating material 12 so as to constitute a heating oven. A stationary base 13a serves to bear the heating oven thereon.

The temperature of the region accommodating the objects within the reaction tube 8 can be appropriately set at a uniform temperature in the range of, for example, 300° to 1200° C. by controlling the voltage applied to the electrical resistance heater 11.

The reaction tube 8 has at its lower part on one side a gas inlet pipe 15 connected thereto for the supply of a treatment gas and being hermetically coupled to the gas supply pipe 6 by means of a spherical joint 20. The reaction tube 8 further has at the lower part on the other side an outlet pipe 17 connected thereto for the discharge of the treatment gas and being also hermetically coupled to a gas exhaust pipe 16 by means of another spherical joint 20. The gas exhaust pipe 16 is communicated with an exhaust equipment not shown, for example, a factory exhaust system, thereby allowing the treatment gas to be drawn off from the reaction tube 8.

A further description will now be given of the spherical joint 20 in the concrete.

Figure 2:
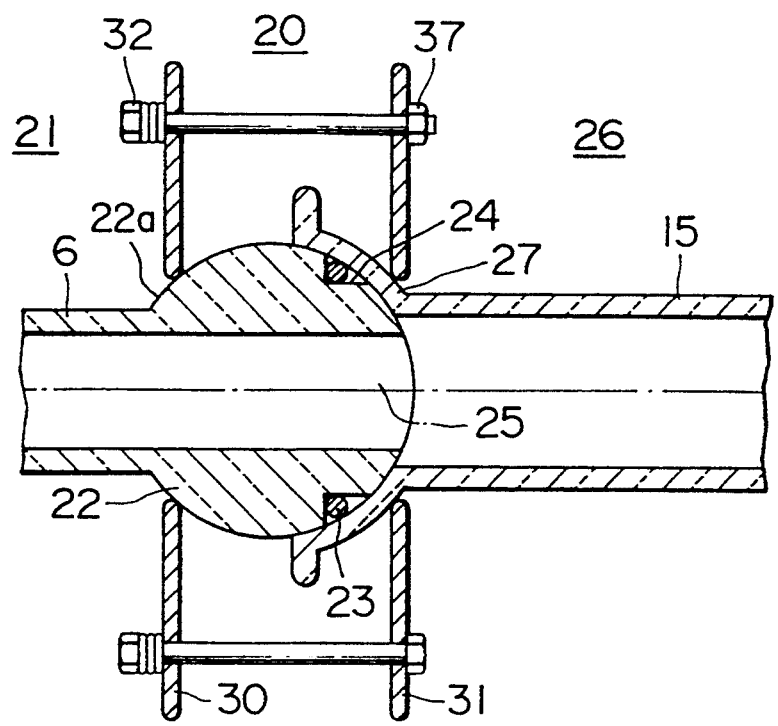
FIG. 2 is a longitudinal sectional view of a first embodiment of the piping connection device in accordance with the present invention.

As shown in FIG. 2, the spherical joint 20 comprises a convex connecting element 21 made of, for example, a quartz glass and having at least a spherical outer shape, and a concave connecting element 26 adapted to mate with, and snugly fit on the convex connecting element 21.

The convex connecting element 21 includes a spherical part 22 integrally connected to one end of the gas supply pipe 6. As a means for hermetically sealing the spherical joint 20, for example, the spherical part 22 has on its spherical sealing surface a resilient heat-resistant member such as an O-ring 23, and an annular groove 24 for receiving the O-ring 23. The spherical part 22 further has a spherical engaging surface 22a opposite the sealing surface, and a through-hole 25 serving as a gas flow passage and opening into the gas supply pipe 6. On the contrary, the concave connecting element 26 defining a concave surface includes a spherically concaved socket part 27 integrally connected to one end of the gas inlet pipe 15 and adapted to snugly mate with the spherical part 22 of the convex connecting element 21. The socket part 27 also has a spherical outer engaging surface.

In order to prevent the O-ring 23 from being heated to, for example, 200° C. or more due to a high-temperature gas flowing through the piping, the spherical joint 20 preferably has a diameter that is at least three times larger than the outer diameter of the piping, and the O-ring 23 is preferably disposed close to the outer periphery farthest from the through-hole 25.

Figure 3:
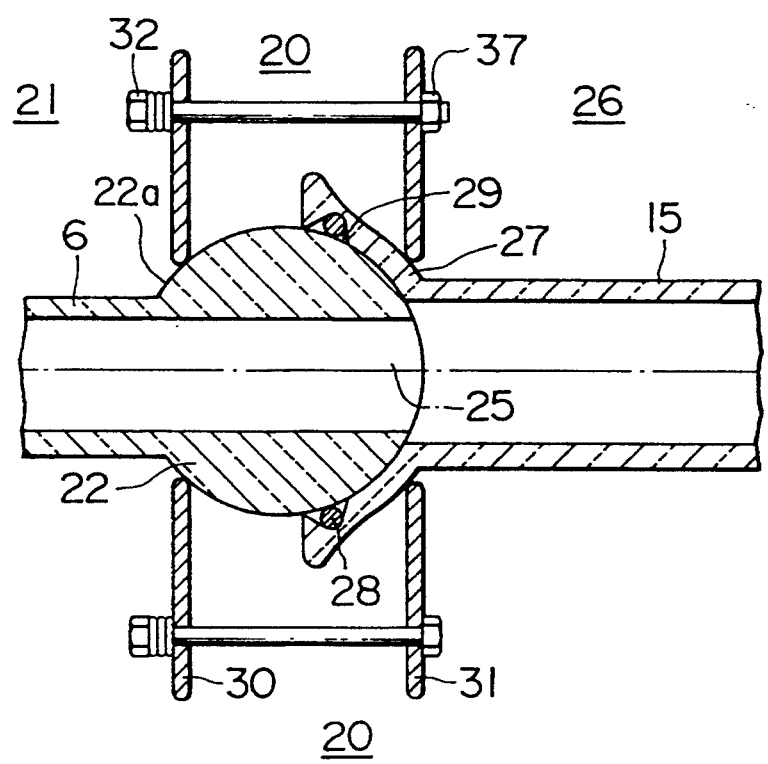
FIG. 3 is a longitudinal sectional view of a second embodiment of the piping connection device in accordance with the present invention.

FIG. 3 illustrates another example of the spherical joint 20 in which the groove for receiving the O-ring is provided in the spherically concaved socket part 27 in place of the spherical part 22 as in FIG. 2. In this case, the socket part 27 includes a groove 29 for receiving a resilient O-ring 28. Preferably, the O-ring 28 is also disposed close to the outermost in the radial direction. The outermost arrangement of the O-ring 28 will prevent it from being affected by the gas flowing through the interior, and thus by the heat since the farther the O-ring from the through-hole 25 the lower the temperature becomes. The other configurations in FIG. 3 are substantially the same as those in FIG. 2, and therefore further description thereof will not be given.

Figure 4:
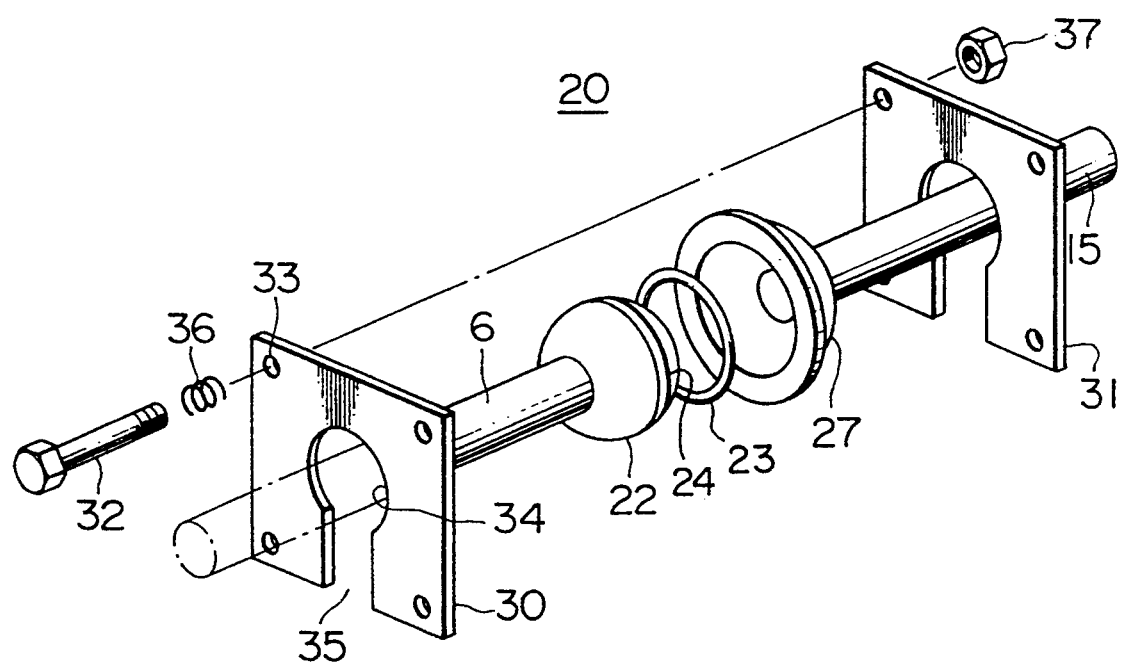
FIG. 4 is an exploded perspective view of the piping connection device in accordance with the present invention.

Referring next to FIG. 4, there are depicted substantially square presser plates 30 and 31 made of, for example, a metal acting as a means for pressingly fixing the spherical joint 20. The presser plates 30 and 31 each include at respective four corners a bolt hole 33 for receiving a bolt 32, and include at respective centers a circular hole 34 having a larger diameter than the pipings 6 and 15 and having a cutout portion 35 for allowing the passage of the gas pipe. A manner of pressingly holding the spherical part 22 and the socket part 24 together by use of biasing force of springs 36 comprises the steps of: mounting astride the presser plates 30 and 31 onto the gas supply pipe 5 and the gas inlet pipe 15; engaging the presser plates 30 and 31 with the spherical joint 20 so as to clamp it; passing the bolts 32 through the bolt holes 33 provided in the four corners of the presser plate 30 by way of the springs 36, and screwing nuts 36 onto the bolts 32.

A description will now be given of an operation of the vertical heat-treating apparatus described hereinabove.

The electrical resistance heater 5 is first energized, and then the oxygen and hydrogen are introduced into the combustion container 2 to burn them for the production of a water vapor. The water vapor is then supplied into the reaction tube 8 through the gas supply pipe 6, the spherical joint 20 and gas inlet pipe 15.

Depending on the process to be carried out, hydrochloric acid (HCl) may be supplied as a reaction gas together with the oxygen and hydrogen in the reaction tube 8, as shown in FIG. 1.

The reaction tube 8 is preheated to, for example, 1000° C. by means of the electrical resistance heater 11, and an oxide film is formed over the surface of the semiconductor wafers 10 resting on the wafer boat 9 being conveyed into the reaction tube 8 with the upward movement of the elevator 14.

A high-temperature exhaust gas after the treatment of the semiconductor wafers 10 is discharged through the outlet pipe 17, the spherical joint 20, and the gas exhaust pipe 16 by means of the exhaust equipment not shown.

An unevenness in the dimensions of the pipings or an insufficient assembling accuracy may possibly result in an angle between the axes of the spherical part 22 and the socket part 27 constituting in cooperation the spherical joint 20. It is, however, extremely difficult to achieve the elimination of the angle in terms of the design or assembly, and accordingly the connection is often made leaving the angle as it stands.

Figure 5:
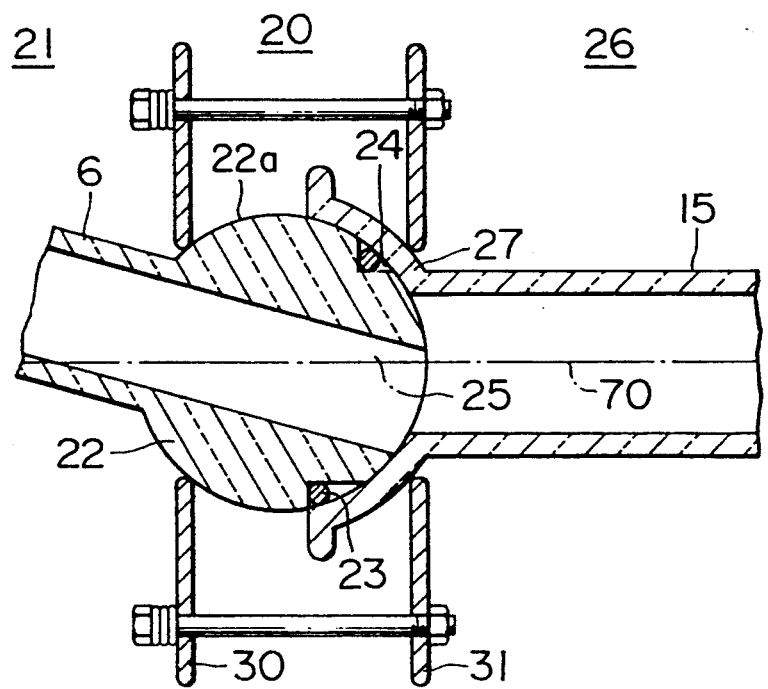
FIG. 5 is a longitudinal sectional view showing a case where the pipes are angularly connected to each other in the embodiment of FIG. 2.

FIG. 5 illustrates a state where the gas supply pipe 6 is angled to the spherical joint 20. The presser plates 30 and 31 are not caused to come into uneven abutment against the spherical joint 20 due to the spherical surface of the spherical part 22 irrespective of the angled connection of the pipings. Thus, the gas supply pipe 6 will not be subjected to an excessive force acting to align the gas supply pipe 6 with the gas inlet pipe 15 even after the clamping of the presser plates 30 and 31. It is to be appreciated that the FIG. 3 embodiment is preferable to the FIG. 2 embodiment since the radial position of the O-ring 28 will not change in FIG. 3 embodiment even when the pipes are angled to each other as shown in FIG. 5.

A certain displacement or deformation of the spherical joint which may arise from a thermal expansion or cleaning can be absorbed by virtue of the O-ring 23, whereby a hermetical sealing is ensured.

It is to be noted that the present invention is not limited to the above embodiments, but is applicable to any apparatus using a high-temperature treatment gas.

Although the above description has been given of the case using a high-temperature gas as a fluid, the present invention may employ a liquid or a granular substance as the fluid. The screwing mechanism used as the pressing mechanism for the joint in the above embodiments may be replaced with other clamping means.

According to the present invention, as described hereinbefore, the following superior function and effect can be exhibited.

The presser plates are not caused to come into uneven abutment against the spherical joint even though the pipings angularly connected to the spherical joint are fastened or clamped together as they are, since the contact surface of the spherical joint is spherically formed. In other words, the clamping does not cause a force acting to align the angled pipings, thus preventing a damage of the pipings. This eliminates the need for a precise angular adjustment and laying in the piping connections. The piping connection device of the present invention can be well adapted to the variation in the connection angle due to a thermal expansion.

What is claimed is:

1. A piping connection arrangement for coupling a first quartz glass pipe and a second quartz glass pipe together to form a substantially hemispherical seal, said arrangement comprising:

a convex quartz glass connecting element adaptable for integrally coupling with the first pipe, said convex connecting element having a spherical convex sealing surface remote from a first coupling location where said convex element and the first pipe would integrally couple, said convex connecting element having a substantially spherical first outer engaging surface located between said convex sealing surface and said first coupling location;

a concave quartz glass connecting element adapted for integral coupling with the second pipe, said concave element having a spherical concave sealing surface which is slidable when in sealing contact with said convex sealing surface to form said hemispherical seal, said concave connecting element having a substantially spherical second outer engaging surface near a second coupling location where said concave element would integrally couple to the second pipe;

a resilient sealing ring disposed between said convex and concave sealing surfaces near an outermost portion of said hemispherical seal and;

presser means for urging said convex and said concave sealing surfaces against each other to establish said sealing contact between said sealing surfaces, said presser means comprising a first presser member locatable about the first pipe to engage said first outer engaging surface, a second presser member locatable about the second pipe to engage said second outer engaging surface, fastening means for fastening said presser members together, and resilient means interposed between at least one of said presser members and a portion of said fastening means, said fastening means and said resilient means urging said first and second presser members toward each other so as to urge said convex and concave sealing surfaces against each other.

2. A piping connection arrangement according to claim 1, wherein said sealing ring is disposed within an annular groove in said convex sealing surface.

3. A piping connection arrangement according to claim 1, wherein said sealing ring is disposed within an annular groove in said concave sealing surface.

4. A piping connection arrangement according to claim 1, wherein said presser members are plates which each have an opening which receives an associated one of the pipes, said plates each having portions about said opening for engaging said outer engaging surfaces of said connecting elements.

5. A piping connection arrangement according to claim 4, wherein said opening and said portions about said openings are at least partially annular.

6. A pipe connection arrangement according to claim 1, wherein said fastening means comprises a bolt and a corresponding nut.

7. A heat-treating apparatus according to claim 6, wherein:

said first piping is connected to an external combustion means, said combustion means including a combustion container, an oxygen supply pipe for the supply of oxygen gas into said combustion container, and a hydrogen supply pipe for the introduction of hydrogen gas into said combustion container.

8. An apparatus for heat-treating a plurality of objects, said apparatus comprising:

means defining a reaction tube;

means for externally heating said reaction tube;

means for conveying objects into said reaction tube;

quartz glass pipe means for feeding and exhausting treatment fluid to and from said reaction tube, said pipe means comprising at least a first pipe portion and a second pipe portion; and pipe connection means provided between said first pipe portion and second pipe portion to form a substantially hemispherical seal therebetween;

said pipe connection means including:

a convex quartz glass connecting element integrally coupled with an end portion of one of said pipe portions, said convex connecting element having a spherical, convex sealing surface remote from a first location where said convex element and said one pipe portion are integrally coupled, said convex connecting element having a substantially spherical outer engaging surface located between said convex sealing surface and said first location;

a concave quartz glass connecting element integrally coupled to an end portion of the other of said pipe portions, said concave connecting element having a spherical concave sealing surface which is slidable when in sealing contact with said convex sealing surface to form said hemispherical seal, said concave connecting element having a substantially spherical outer engaging surface near a second location where said concave element is integrally coupled with said other pipe portion;

a resilient sealing ring disposed between said convex and concave sealing surfaces near an outermost portion of said hemispherical seal and;

presser means for urging said convex and said concave sealing surfaces against each other to establish said sealing contact between said sealing surfaces, said presser means comprising a first presser member locatable about said one pipe portion to engage said first outer engaging surface, a second presser member locatable about said other pipe portion to engage said second outer engaging surface, fastening means for fastening said presser members together, and resilient means interposed between at least one of said presser members and a portion of said fastening means, said fastening means and said resilient means urging said first and second presser members toward each other so as to urge said convex and concave sealing surfaces against each other.

9. A heat-treating apparatus according to claim 8, wherein said sealing ring is disposed in a groove in said convex sealing surface.

10. A heat-treating apparatus according to claim 8, wherein said sealing ring is disposed in a groove said convex sealing surface.

11. A heat-treating apparatus according to claim 8, wherein said presser members are plates which each have an opening receiving one of said pipe portions, said plates each having portions about said opening for engaging said outer engaging surfaces of said connection elements.

12. A pipe connection arrangement according to claim 11, wherein said opening and said portions about said openings are at least partially annular.

13. A heat-treating apparatus according to claim 8, wherein said fastening means comprises a bolt and nut.

* * * * *